(12) United States Patent
Lyons

(10) Patent No.: US 11,360,652 B2
(45) Date of Patent: Jun. 14, 2022

(54) APPARATUS AND METHOD FOR PROVIDING FOR RECEIPT OF INDIRECT TOUCH INPUT TO A TOUCH SCREEN DISPLAY

(71) Applicant: Nokia Technologies Oy, Espoo (FI)

(72) Inventor: Kenton Lyons, Santa Clara, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 1010 days.

(21) Appl. No.: 15/022,256

(22) PCT Filed: Oct. 22, 2013

(86) PCT No.: PCT/US2013/066106
§ 371 (c)(1),
(2) Date: Mar. 16, 2016

(87) PCT Pub. No.: WO2015/060824
PCT Pub. Date: Apr. 30, 2015

(65) Prior Publication Data
US 2016/0231904 A1    Aug. 11, 2016

(51) Int. Cl.
*G06F 3/04842* (2022.01)
*G06F 3/0488* (2022.01)
(Continued)

(52) U.S. Cl.
CPC ...... *G06F 3/04842* (2013.01); *G06F 3/03547* (2013.01); *G06F 3/0481* (2013.01);
(Continued)

(58) Field of Classification Search
CPC ............... G06F 3/03547; G06F 3/0416; G06F 3/048–04897; G06F 2203/0338
See application file for complete search history.

(56) References Cited

U.S. PATENT DOCUMENTS

| 5,293,529 A | * | 3/1994 | Yoshimura | G06F 3/0346 345/157 |
| 5,926,178 A | * | 7/1999 | Kurtenbach | G06F 3/0482 715/834 |

(Continued)

FOREIGN PATENT DOCUMENTS

| CN | 101523860 A | 9/2009 |
| CN | 101943989 A | 1/2011 |

(Continued)

OTHER PUBLICATIONS

International Search Report and Written Opinion received for corresponding Patent Cooperation Treaty Application No. PCT/US2013/066106, dated Apr. 23, 2014, 9 pages.

(Continued)

*Primary Examiner* — Kieu D Vu
*Assistant Examiner* — Alvaro R Calderon, IV
(74) *Attorney, Agent, or Firm* — Alston & Bird LLP

(57) ABSTRACT

Mechanisms are described for receiving touch inputs on a touch screen display in a way that does not obscure the images and content presented on the display. Content, including selectable elements, is displayed in a main portion of a display, where as an input region that does not overlap with the main portion is provided on the display for receiving touch input selecting particular selectable elements. An extrapolated touch input in the main portion of the display is determined based on the location of the touch input in the input region, such that selection of a particular selectable element may be accomplished when the location of the extrapolated touch input coincides with the location of the selectable element.

22 Claims, 10 Drawing Sheets

(51) Int. Cl.
*G06F 3/0354* (2013.01)
*G06F 3/0481* (2022.01)
*G06F 3/04883* (2022.01)
*G06F 3/04886* (2022.01)

(52) U.S. Cl.
CPC ........ *G06F 3/0488* (2013.01); *G06F 3/04883* (2013.01); *G06F 3/04886* (2013.01); *G06F 2203/0338* (2013.01)

(56) References Cited

U.S. PATENT DOCUMENTS

| | | | | |
|---|---|---|---|---|
| 6,727,892 | B1* | 4/2004 | Murphy | G06F 3/04842 178/18.01 |
| 7,009,599 | B2* | 3/2006 | Pihlaja | G06F 1/1626 345/157 |
| 7,479,947 | B2* | 1/2009 | Pihlaja | G06F 1/1626 345/156 |
| 2003/0095095 | A1* | 5/2003 | Pihlaja | G06F 1/1626 345/156 |
| 2003/0169294 | A1* | 9/2003 | Vatula | G06F 9/451 715/764 |
| 2007/0141526 | A1* | 6/2007 | Eisenberg | A61C 7/00 433/24 |
| 2007/0247435 | A1* | 10/2007 | Benko | G06F 3/0488 345/173 |
| 2008/0056208 | A1* | 3/2008 | Hinrikus | H04L 12/5692 370/338 |
| 2010/0085317 | A1* | 4/2010 | Park | G06F 1/1626 345/173 |
| 2010/0295799 | A1* | 11/2010 | Nicholson | G06F 1/1626 345/173 |
| 2010/0302146 | A1* | 12/2010 | Li | G06F 3/04817 345/157 |
| 2010/0315337 | A1* | 12/2010 | Ferren | G06F 1/169 345/158 |
| 2011/0004821 | A1* | 1/2011 | Miyazawa | G06F 3/04883 715/702 |
| 2011/0138275 | A1* | 6/2011 | Yu | G06F 3/04817 715/702 |
| 2011/0304557 | A1* | 12/2011 | Wilburn | G06F 3/0488 345/173 |
| 2012/0001858 | A1* | 1/2012 | Matsuda | G06F 3/0482 345/173 |
| 2012/0162091 | A1* | 6/2012 | Lyons | G06F 3/0488 345/173 |
| 2013/0093688 | A1* | 4/2013 | Papakipos | G06F 1/169 345/173 |
| 2013/0127750 | A1* | 5/2013 | Horiuchi | G06F 3/0416 345/173 |
| 2013/0154955 | A1* | 6/2013 | Guard | G06F 1/1626 345/173 |
| 2013/0271419 | A1* | 10/2013 | Sharma | G06F 3/03 345/173 |
| 2014/0181750 | A1* | 6/2014 | Fujiwara | G06F 3/04817 715/835 |
| 2014/0351755 | A1* | 11/2014 | Miyazawa | G06F 3/04883 715/810 |

FOREIGN PATENT DOCUMENTS

| | | | |
|---|---|---|---|
| CN | 102804107 A | 11/2012 | |
| CN | 103164153 A | 6/2013 | |
| EP | 1107100 A1 | 6/2001 | |
| EP | 2341420 A1 | 7/2011 | |
| JP | H11-507455 A | 6/1999 | |
| JP | 2002-333951 A | 11/2002 | |
| JP | 2007-200002 A | 8/2007 | |
| JP | 2011-013980 A | 1/2011 | |
| JP | 2011-120090 A | 6/2011 | |
| JP | 2013-109456 A | 6/2013 | |
| JP | 2014-123197 A | 7/2014 | |
| KR | 2012-0028944 A | 3/2012 | |
| WO | WO-0011541 A1 * | 8/1999 | ............ G06F 3/033 |
| WO | 2000/011541 A1 | 3/2000 | |
| WO | 2013/048486 A1 | 4/2013 | |

OTHER PUBLICATIONS

Partial Supplementary European Search Report received for corresponding European Patent Application No. 13895993.7, dated May 19, 2017, 13 pages.
Office action received for corresponding Chinese Patent Application No. 201380080384.6, dated Mar. 20, 2018, 9 pages of office action and no page of translation available.
Extended European Search Report received for corresponding European Patent Application No. 13895993.7, dated Sep. 18, 2017, 12 pages.
Office action received for corresponding European Patent Application No. 13895993.7, dated May 2, 2018, 4 pages.
"Cursor Options", Imgpresents, Retrieved on Apr. 12, 2017, Webpage available at : https://www.imgpresents.com/magnify/guide/html/fullscreencursoroptions.html.
Office action received for corresponding Japanese Patent Application No. 2016-547828, dated Mar. 29, 2017, 3 pages of office action and 4 pages of translation available.
Office action received for corresponding Korean Patent Application No. 2016-7013442, dated Nov. 16, 2017, 5 pages of office action and 8 pages of office action translation available.
Office Action for Chinese Application No. 201380080384.6 dated Oct. 15, 2018, 9 pages.
Office Communication for European Application No. 13 895 993.7 dated May 2, 2018, 3 pages.
Office Action for Chinese Application No. 201380080384.6 dated Jan. 29, 2019, 5 pages.
Office Action for Chinese Application No. 201380080384.6 dated May 29, 2019, 5 pages.
Office Action for Indian Application No. 201647017055 dated May 20, 2020, 9 pages.
Summons to Attend Oral Proceedings for European Application No. 13 895 993.7 dated May 28, 2020, 13 pages.
Minutes of the Oral Proceedings for European Application No. 13895993.7 dated Nov. 19, 2020, 4 pages.
Decision to Refuse for European Application No. 13895993.7 dated Nov. 24, 2020, 26 pages.
Decision to Grant for Japanese Application No. 2016-547828 dated Jul. 21, 2017, 5 pages.
Notice of Allowance for Korean Application No. 10-2016-7013442 dated Mar. 5, 2018, 3 pages.

* cited by examiner

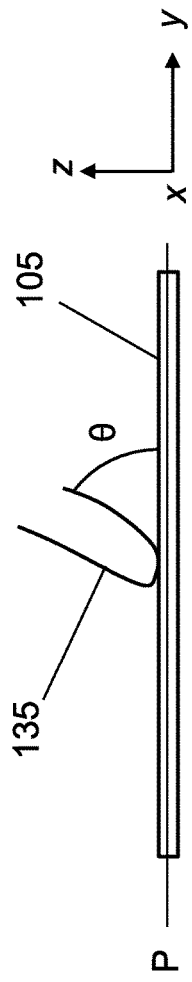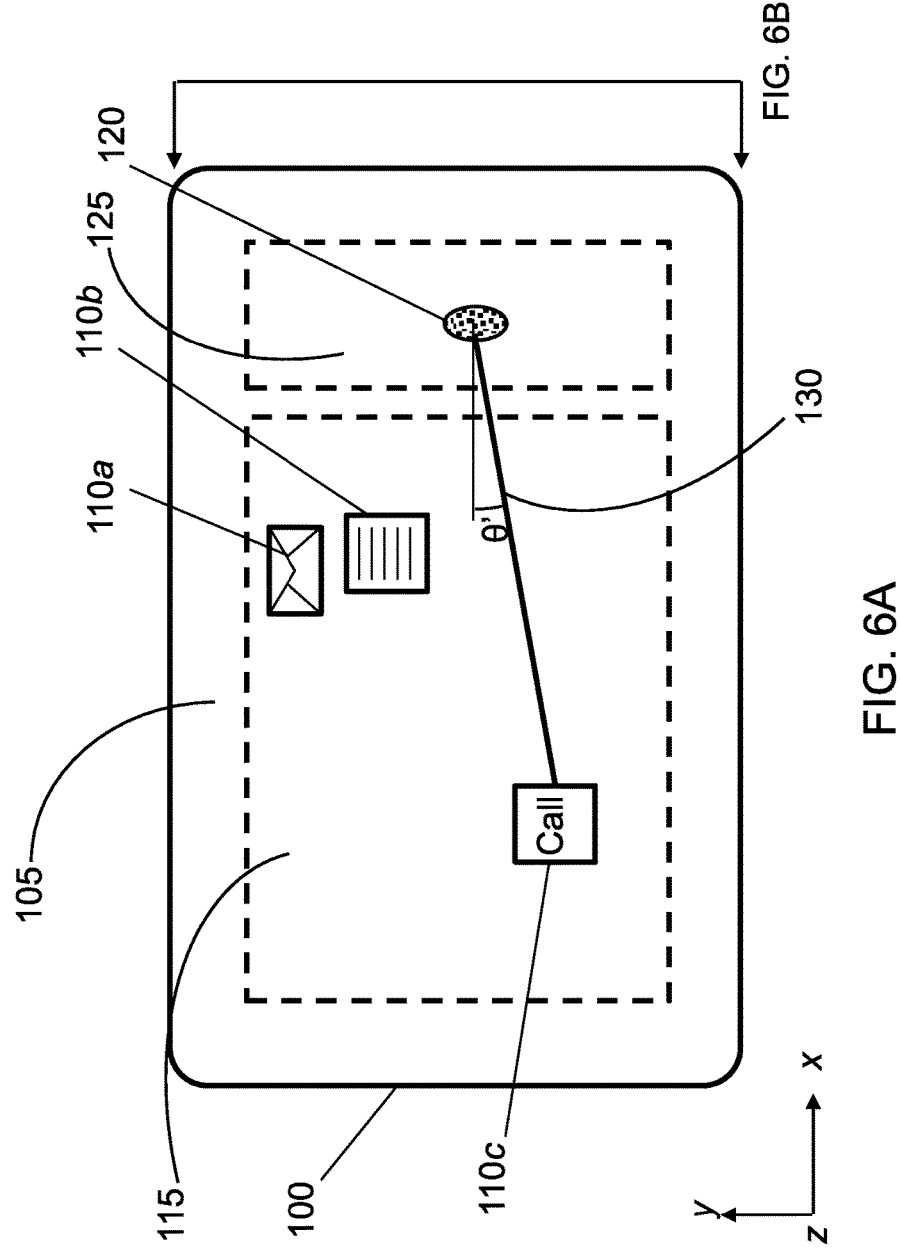

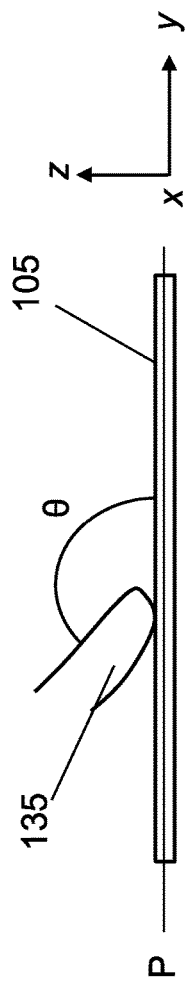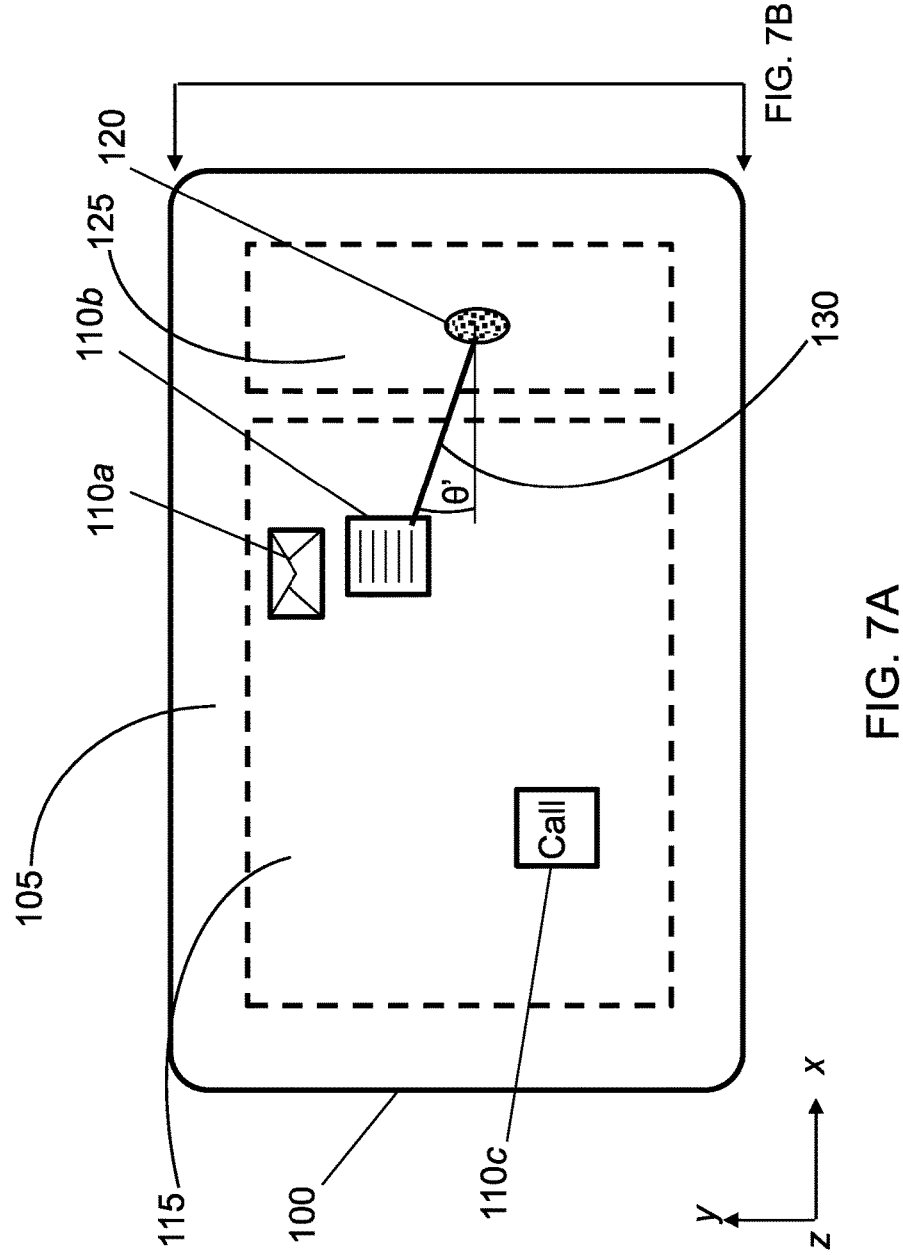

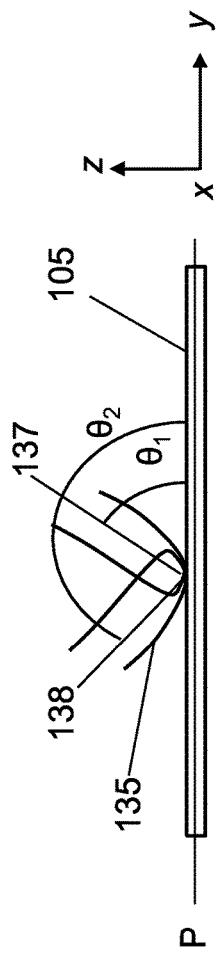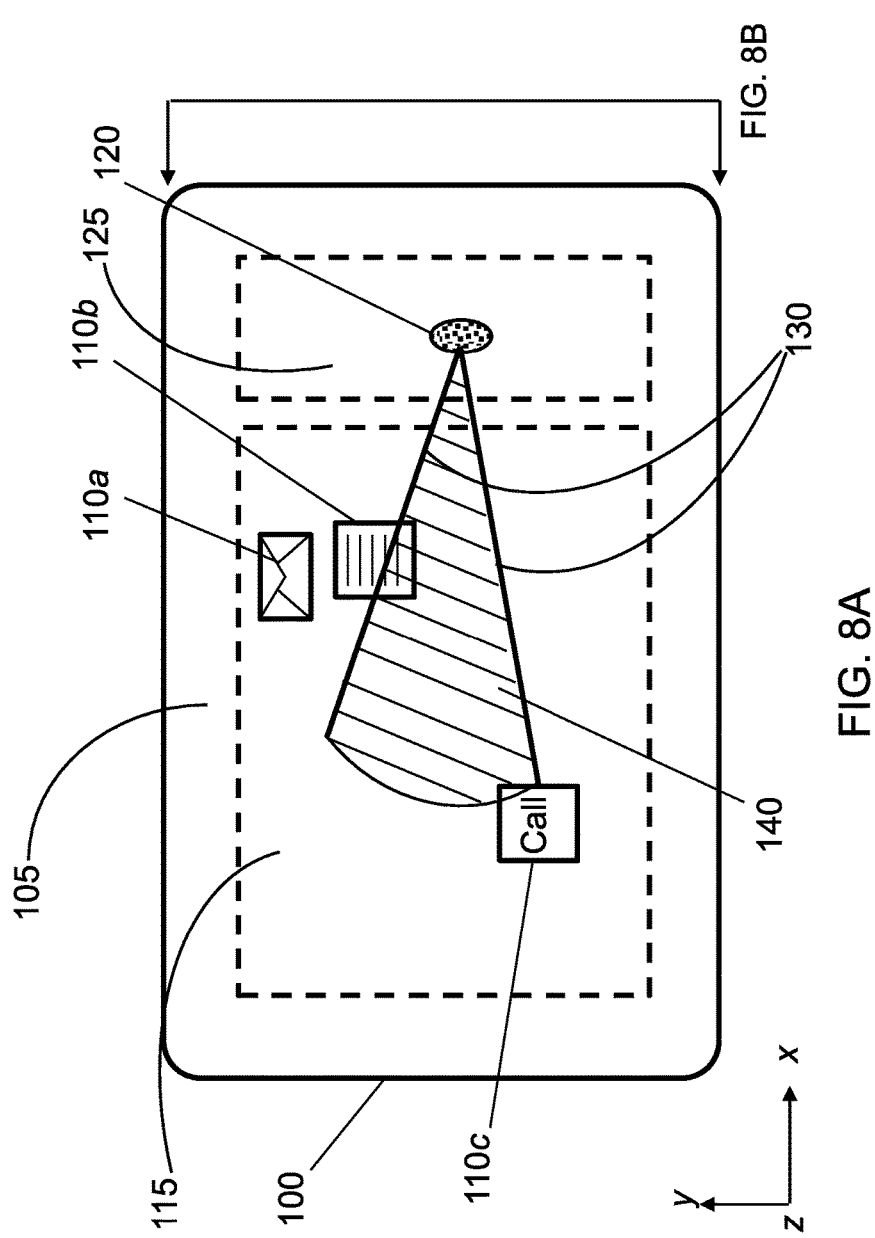

APPARATUS AND METHOD FOR PROVIDING FOR RECEIPT OF INDIRECT TOUCH INPUT TO A TOUCH SCREEN DISPLAY

RELATED APPLICATION

This application was originally filed as PCT Application No. PCT/US2013/066106 filed Oct. 22, 2013.

TECHNOLOGICAL FIELD

Example embodiments of the present invention relate generally to receipt of input via a touch screen display.

BACKGROUND

Touch screen displays are becoming more and more prevalent in user devices, both large and small. Devices such as watches, smart phones, tablet computers, and other mobile devices, as well as other devices such as computer displays, televisions, and other non-mobile terminals now come equipped with display screens that are configured to receive input from a user as a result of the user's contact (e.g., using the user's finger, a stylus, or some other object) with the screen on which content is displayed.

BRIEF SUMMARY OF EXAMPLE EMBODIMENTS

Conventional techniques for receiving touch inputs require a user to select a selectable element displayed on a touch screen of the user device by touching the screen in the location where the selectable element is being displayed. As a result, the user's finger or other object used to select the selectable element (e.g., icon, text, etc.) may be obscure the selectable element and/or the content displayed around the selectable element as the user applies the input, which may be burdensome on the user and impede the user's ability to consume the content displayed. Accordingly, it may be desirable to provide mechanisms for receiving a user's touch input without obscuring the selectable elements that the user is attempting to select or other content displayed on the touch screen.

Embodiments of the present invention thus provide mechanisms for displaying content, including selectable elements, in a main portion of a display and receiving a touch input in an input region proximate the main portion of the display, where the input region does not overlap with the main portion. By determining an extrapolated touch input in the main portion of the display based on the location of the touch input in the input region, selection of a particular selectable element may be accomplished when the location of the extrapolated touch input coincides with the location of the selectable element.

Accordingly, in some embodiments, an apparatus may be provided that includes at least one processor and at least one memory including computer program code. The at least one memory and the computer program code may be configured to, with the processor, cause the apparatus to at provide for presentation of a selectable element in a main portion of a display; receive a touch input in an input region proximate the main portion of the display, wherein the input region does not overlap with the main portion; determine an extrapolated touch input in the main portion of the display based on a location of the touch input in the input region; and provide for selection of the selectable element in an instance in which a location of the extrapolated touch input coincides with a location of the selectable element.

In some embodiments, the touch input may comprise a first touch input and the extrapolated touch input may comprise a first extrapolated touch input. The at least one memory and the computer program code may be further configured to, with the processor, cause the apparatus to receive a second touch input in the input region, determine a second extrapolated touch input in the main portion of the display based on the location of the second touch input in the input region, and provide for selection of the selectable element in an instance in which an intersection of the first extrapolated touch input and the second extrapolated touch input coincides with the location of the selectable element. The at least one memory and the computer program code may be configured to, with the processor, cause the apparatus to detect an angle associated with the touch input and to determine the location of the extrapolated touch input based on the angle of the touch input that is detected.

In some cases, the at least one memory and the computer program code may be configured to, with the processor, cause the apparatus to provide a visual representation of the location of the extrapolated touch input in the main portion of the display. The visual representation may comprise a ray extending from the location of the touch input in the input region at least partially into the main portion of the display. The at least one memory and the computer program code may be configured to, with the processor, cause the apparatus to modify the location of the extrapolated touch input based on a change in the angle of the touch input.

The input region may be disposed along an edge of the display. The input region may be defined by a surface that is in substantially the same plane as the display. In other cases, the input region may be defined by a surface that defines a non-zero angle with the display. In still other embodiments, the input region may be defined by the display.

In other embodiments, a method and a computer program product are described for providing for presentation of a selectable element in a main portion of a display; receiving a touch input in an input region proximate the main portion of the display, wherein the input region does not overlap with the main portion; determining an extrapolated touch input in the main portion of the display based on a location of the touch input in the input region; and providing for selection of the selectable element in an instance in which a location of the extrapolated touch input coincides with a location of the selectable element.

In some cases, the touch input comprises a first touch input and the extrapolated touch input comprises a first extrapolated touch input. Embodiments of the method and computer program product may in such cases include receiving a second touch input in the input region, determining a second extrapolated touch input in the main portion of the display based on the location of the second touch input in the input region, and providing for selection of the selectable element in an instance in which an intersection of the first extrapolated touch input and the second extrapolated touch input coincides with the location of the selectable element.

An angle associated with the touch input may be detected in some cases, and the location of the extrapolated touch input may be determined based on the angle of the touch input that is detected. A visual representation of the location of the extrapolated touch input may be provided in the main portion of the display. In some embodiments, the visual representation may comprise a ray extending from the location of the touch input in the input region at least partially into the main portion of the display. In other cases, the location of the extrapolated touch input may be modified based on a change in the angle of the touch input.

The input region may be disposed along an edge of the display. The input region may be defined by a surface that is in substantially the same plane as the display. Alternatively, the input region may be defined by a surface that defines a non-zero angle with the display.

In still other embodiments, an apparatus is described for receiving indirect touch input to a touch screen display. The apparatus may include means for providing for presentation of a selectable element in a main portion of a display; means for receiving a touch input in an input region proximate the main portion of the display, wherein the input region does not overlap with the main portion; means for determining an extrapolated touch input in the main portion of the display based on a location of the touch input in the input region; and means for providing for selection of the selectable element in an instance in which a location of the extrapolated touch input coincides with a location of the selectable element.

In some embodiments, the touch input may comprise a first touch input and the extrapolated touch input may comprise a first extrapolated touch input. In such cases, the apparatus may further comprise means for receiving a second touch input in the input region; means for determining a second extrapolated touch input in the main portion of the display based on the location of the second touch input in the input region; and means for providing for selection of the selectable element in an instance in which an intersection of the first extrapolated touch input and the second extrapolated touch input coincides with the location of the selectable element.

In some cases, the apparatus may further comprise means for detecting an angle associated with the touch input and means for determining the location of the extrapolated touch input based on the angle of the touch input that is detected. Additionally or alternatively, the apparatus may further comprise means for providing a visual representation of the location of the extrapolated touch input in the main portion of the display.

BRIEF DESCRIPTION OF THE SEVERAL VIEWS OF THE DRAWINGS

Figure 1:
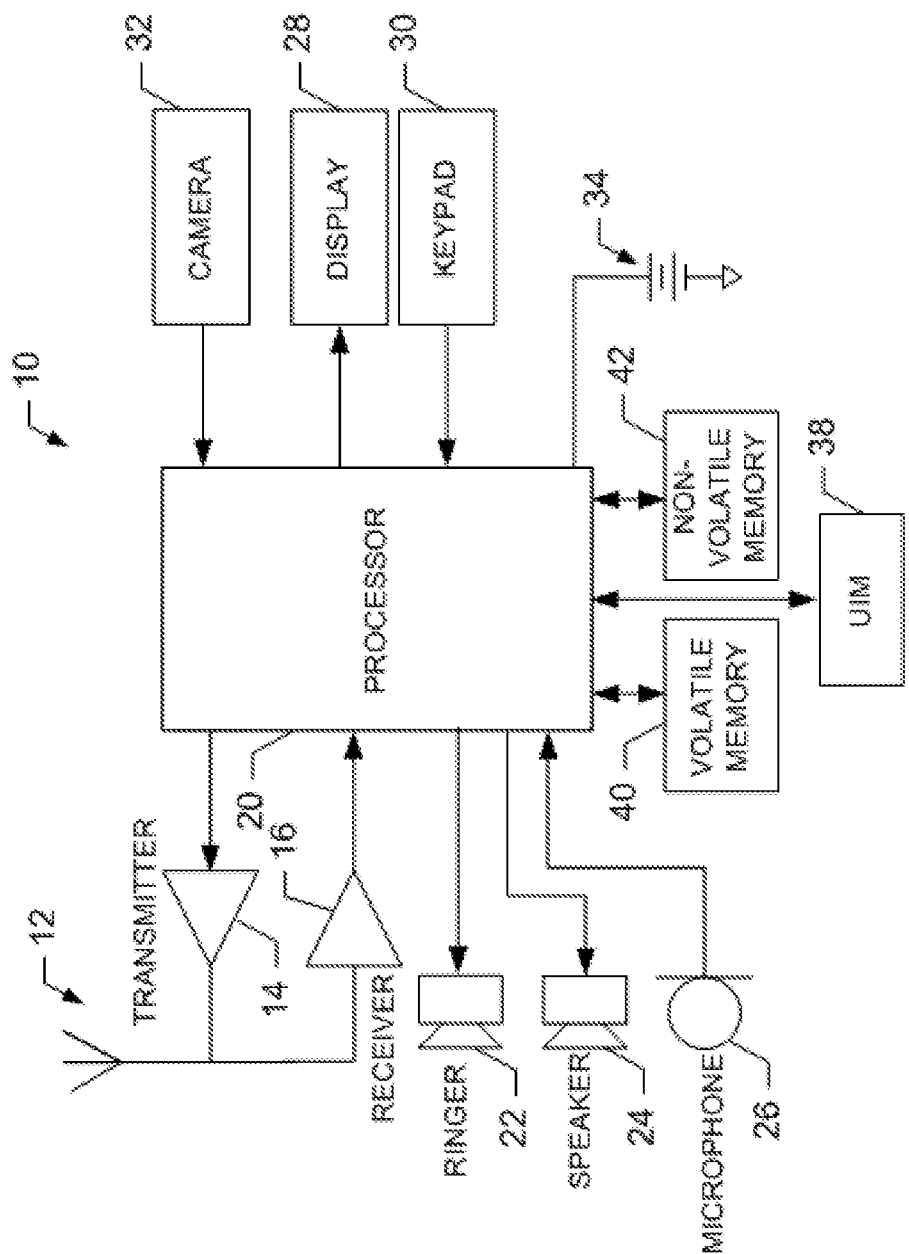
Figure 2:
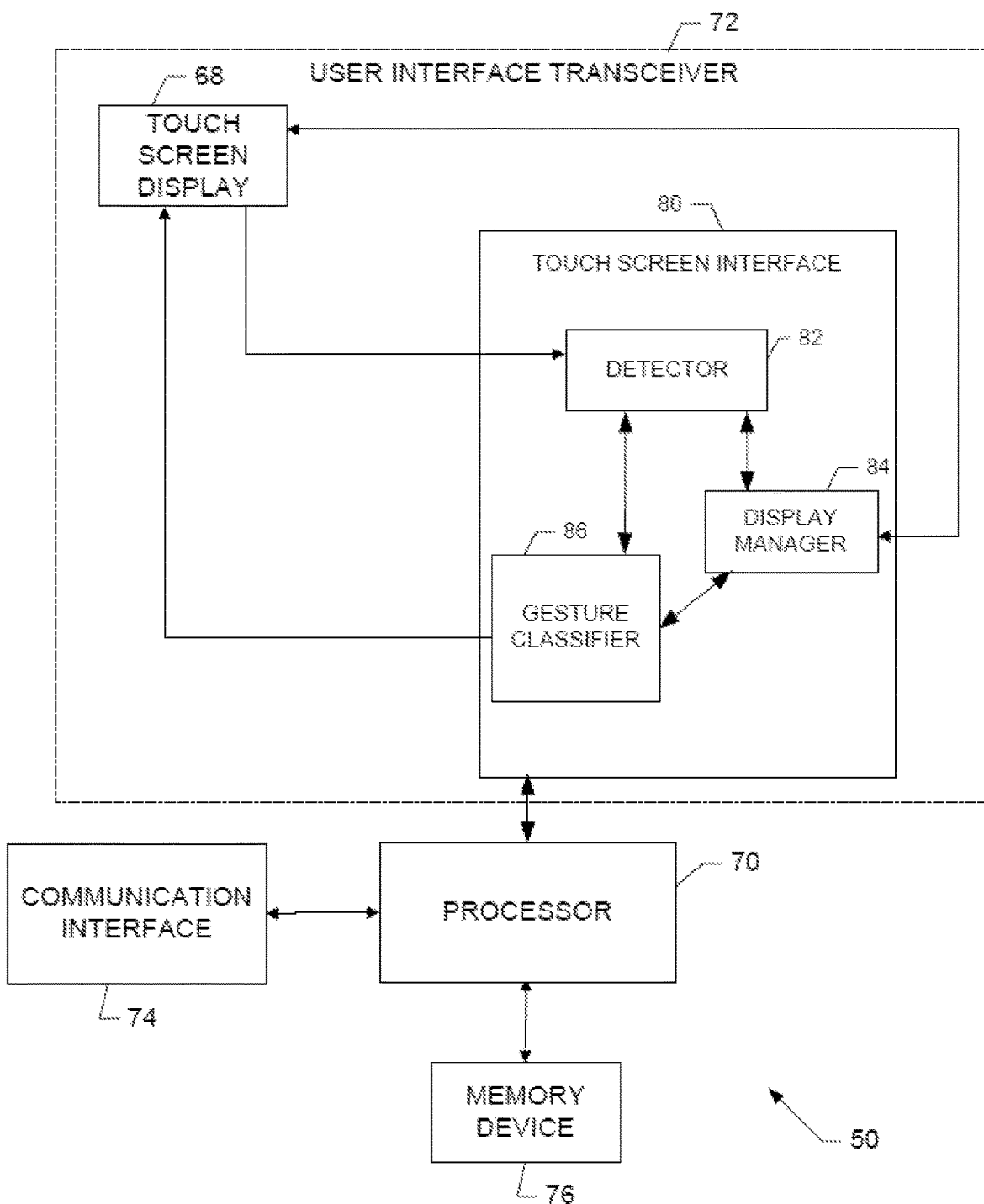
Figure 3:
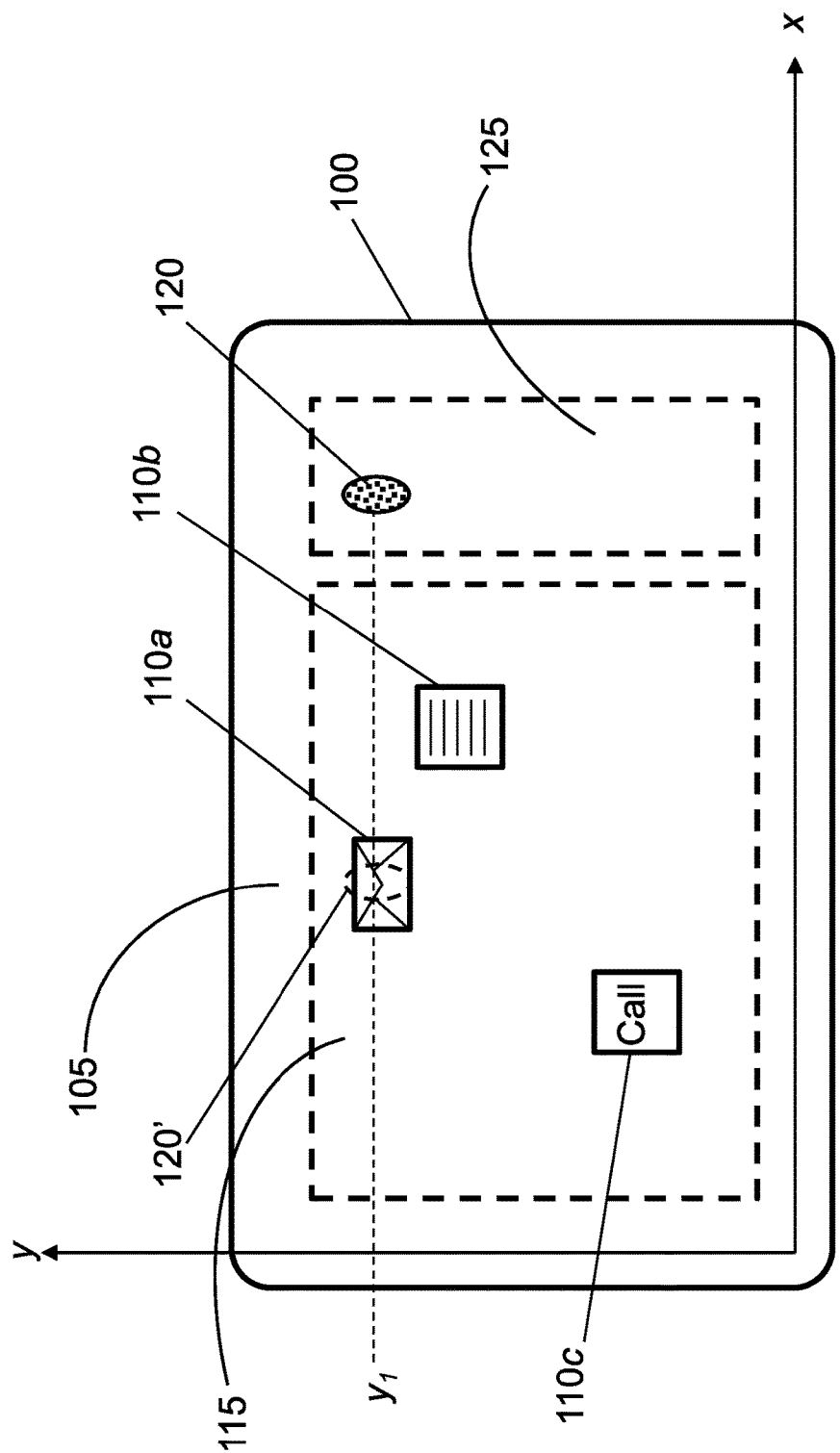
Figure 4:
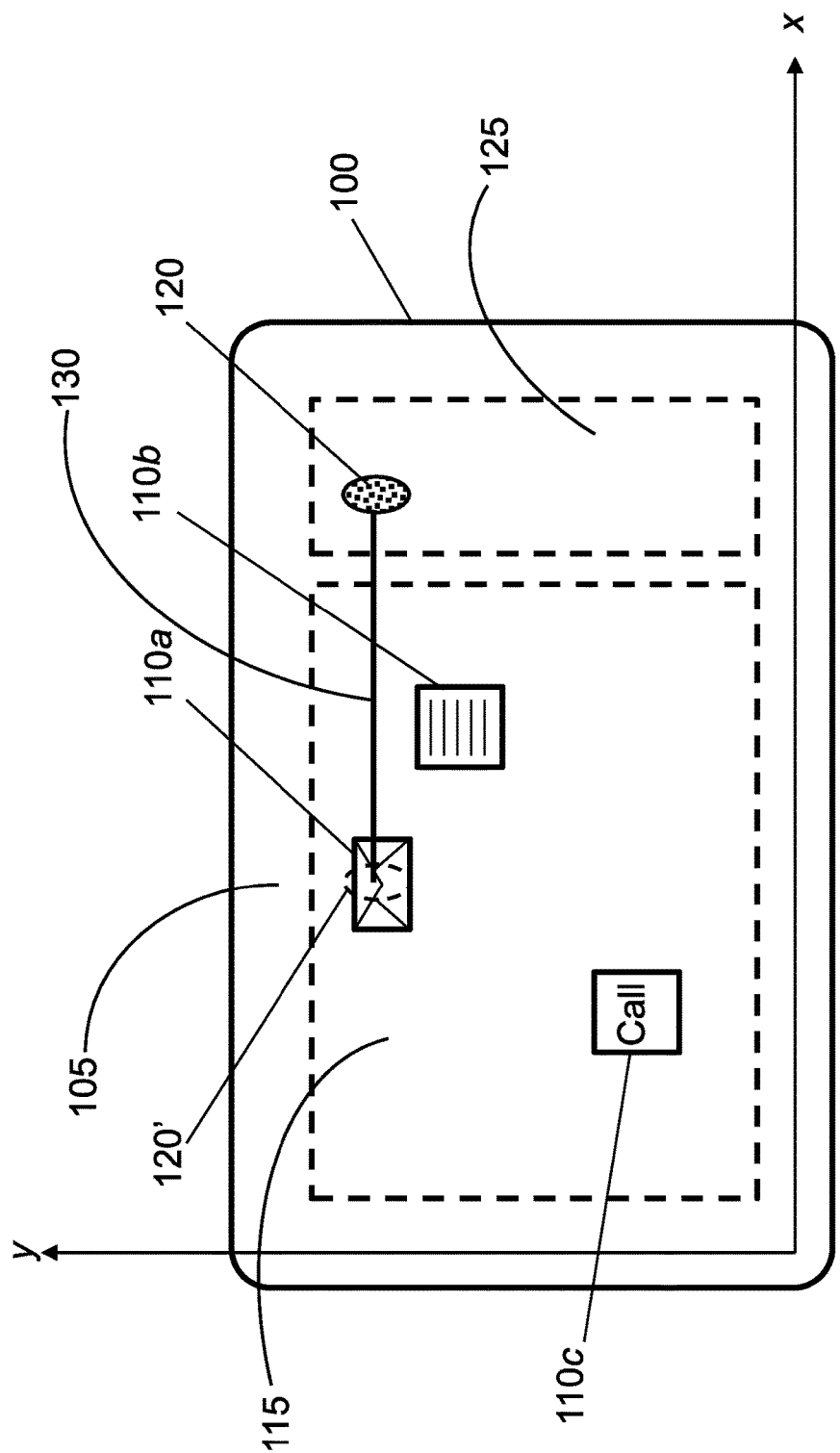
Figure 5:
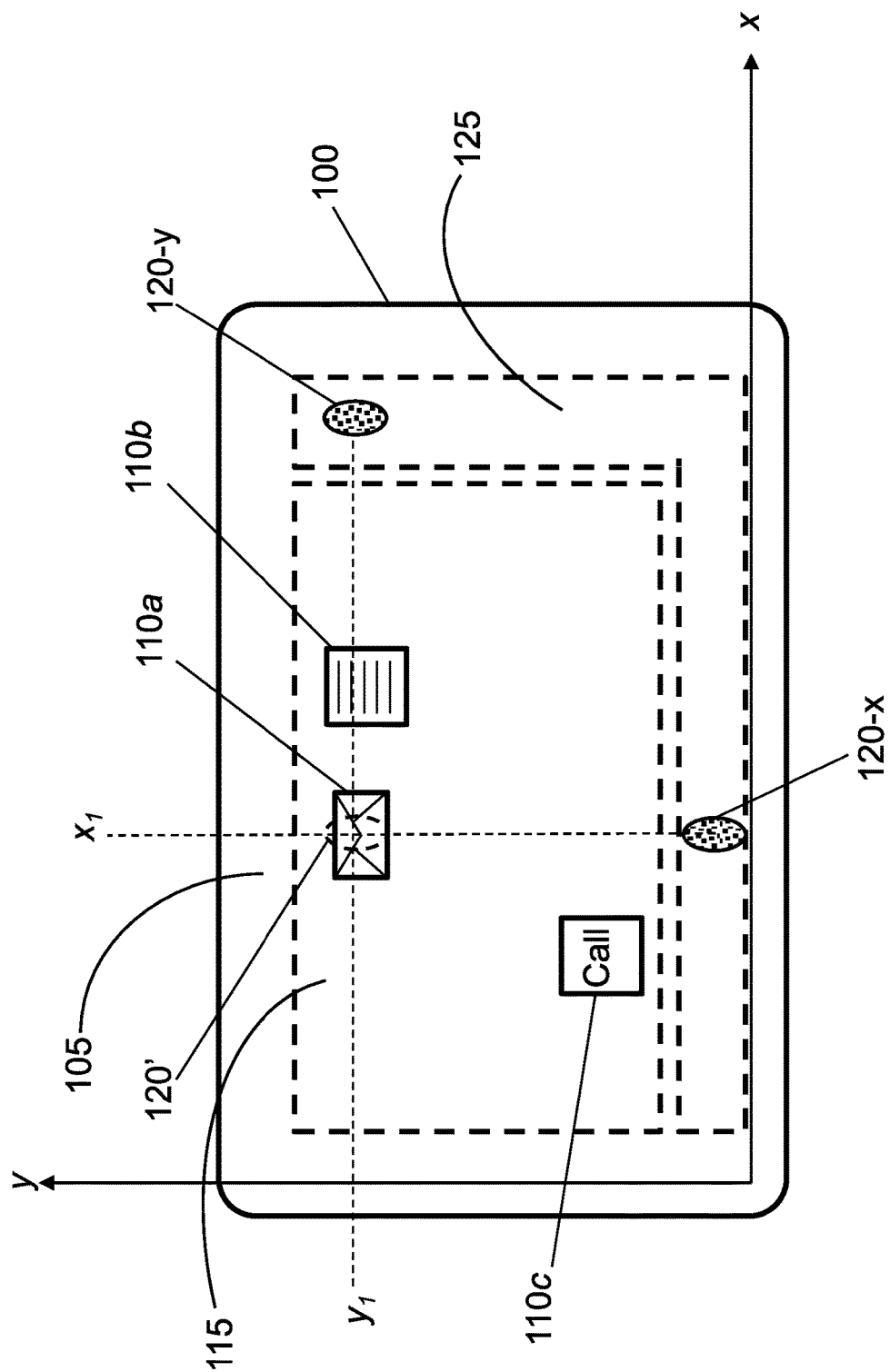
Figure 9:
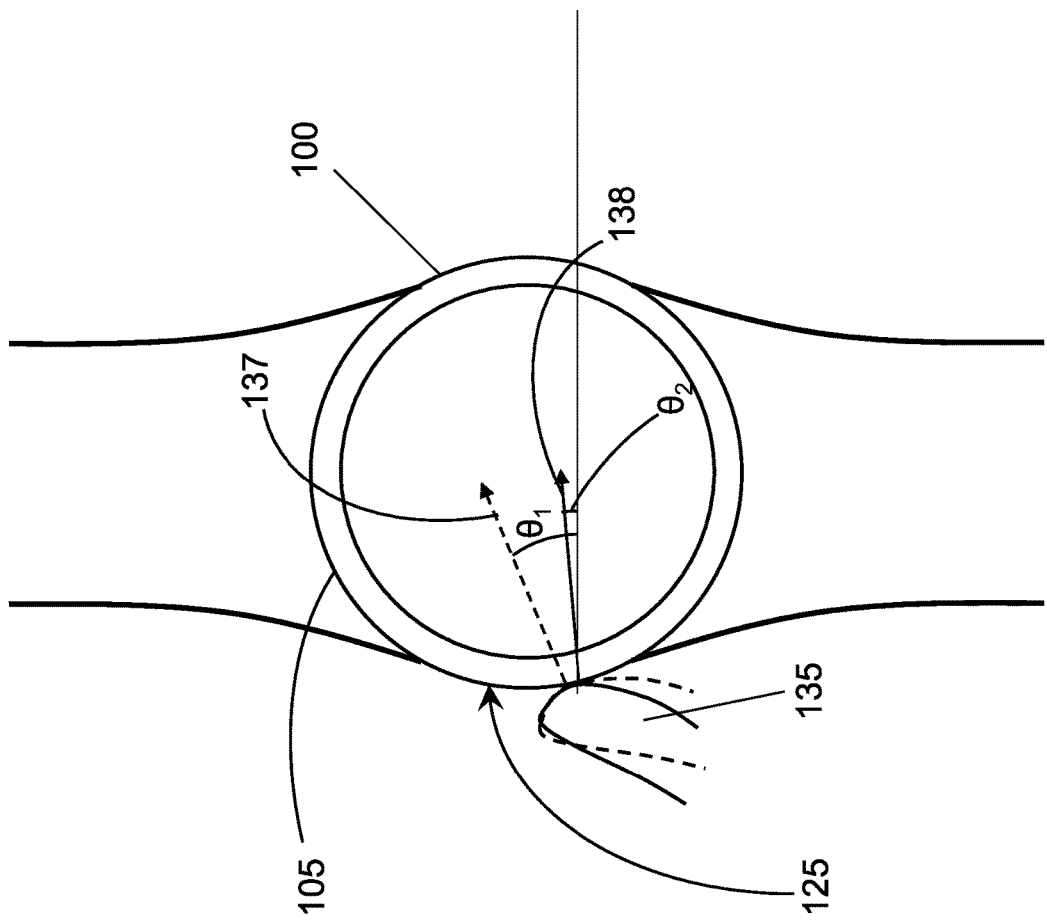
Figure 10:
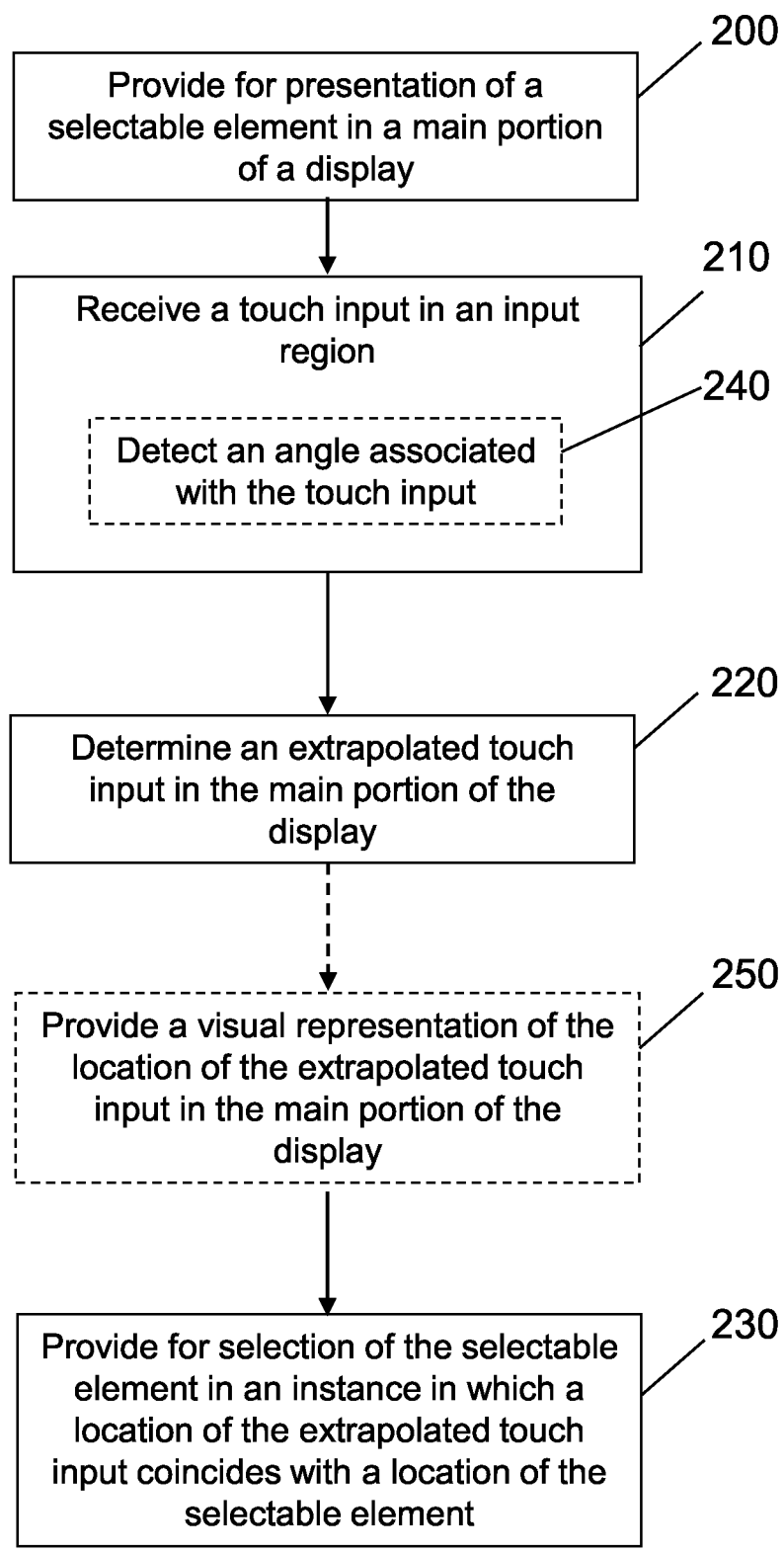

Having thus described example embodiments of the invention in general terms, reference will now be made to the accompanying drawings, which are not necessarily drawn to scale, and wherein:

FIG. 1 illustrates one example of a communication system according to an example embodiment of the present invention;

FIG. 2 illustrates a schematic block diagram of an apparatus for receiving indirect touch input to a touch screen display according to an example embodiment of the present invention;

FIG. 3 illustrates a user device with a touch screen display having a main portion and an input region according to an example embodiment of the present invention;

FIG. 4 illustrates a user device with a touch screen display having a main portion and an input region, where a ray is shown extending from the location of the touch input according to an example embodiment of the present invention;

FIG. 5 illustrates a user device with a touch screen display having a main portion and an input region extending along two edges of the display for receiving two touch inputs according to an example embodiment of the present invention;

FIGS. 6A and 6B illustrate a user's application of a touch input to a user device, where the input involves an angle according to an example embodiment of the present invention;

FIGS. 7A and 7B illustrate a user's application of a touch input to a user device, where the input involves a different angle than that shown in FIGS. 6A and 6B according to an example embodiment of the present invention;

FIGS. 8A and 8B illustrate a user's application of a rocking touch input to a user device according to an example embodiment of the present invention;

FIG. 9 illustrates a user device with a touch screen display having a main portion and an input region according to another example embodiment of the present invention; and FIG. 10 illustrates a flowchart of methods of receiving indirect touch input to a touch screen display according to an example embodiment of the present invention.

DETAILED DESCRIPTION

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, user devices with touch screens displays are configured to display content including selectable elements and to receive touch input from the user to select a particular one or more of the selectable elements to execute certain operations. In this regard, the term "selectable element" refers to, e.g., icons for launching applications, links for navigating to a website, and other graphical or textual content that, when selected, provides for execution of a particular operation.

In devices having conventional touch screen displays, the user's touch input is received at a location on the screen that coincides with the location where the desired selectable element is displayed. Depending on the size of the selectable element as compared to the size of the object used to provide the touch input (e.g., the user's finger), often the selectable element being selected is obscured by the object in the course of providing the input. For example, the user's finger may temporarily cover up the words or images of the selectable element as the touch input is being applied to the touch screen. In some cases, the object applying the touch input may also cover up content in the vicinity of the selectable element being selected, including other selectable elements and other content being consumed by the user. Thus, providing a touch input that coincides with the location of the selectable element may, at least temporarily, interrupt the user's consumption of the displayed content and/or cause the user to lack a visual confirmation of the particular selectable element(s) being selected at the time the input is applied.

In addition, in cases in which a touch screen display is relatively large, such as in the case of a display that is mounted to a wall of a classroom or conference room, it may be difficult for a user to reach the location on the display where the selectable element is displayed to apply the touch input at that location. The user may have to take a few steps to be able to reach the location of the desired selectable element and/or, in some cases, may need to stand on a footstool, depending on the size of the display, the location of the selectable element, and the height of the user. Such challenges may be in addition to the fact that the user's reach to select the selectable element may obscure other content being presented on the display (e.g., to the classroom or audience).

Accordingly, example embodiments of the present invention provide mechanisms for receiving a user's touch input without obscuring the selectable element and/or other content displayed on a main portion of the touch screen display by providing an input region proximate the main portion of the display that does not overlap with the main portion and that is configured to receive touch inputs. As described in greater detail below, an extrapolated touch input in the main portion of the display may be determined based on the location of the touch input in the input region, and selection of a particular selectable element may be accomplished when the location of the extrapolated touch input coincides with the location of the selectable element.

Turning now to FIG. 1, which provides one example embodiment, a block diagram of a mobile terminal 10 that would benefit from embodiments of the present invention is illustrated. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), watches, mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments, such as large, stand-alone touch screen displays that are configured to be mounted to a wall or are otherwise configured for providing content for viewing by a group.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

An example embodiment of the invention will now be described with reference to FIG. 2, which depicts certain elements of an apparatus 50 that provides for receipt of indirect touch input to a touch screen display. The apparatus 50 of FIG. 2 may be employed, for example, with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a watch, a personal computer, a tablet, a mobile telephone, a large, stand-alone, mountable display, or other user terminal. Moreover, in some cases, part or all of the apparatus 50 may be on a fixed device such as a server or other service platform, and the content may be presented (e.g., via a server/client relationship) on a remote device such as a user terminal (e.g., the mobile terminal 10) based on processing that occurs at the fixed device.

It should also be noted that while FIG. 2 illustrates one example of a configuration of an apparatus 50 for receiving indirect touch input, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard-coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive touch inputs at the touch screen display 68 and to analyze and/or modify a response to such indications based on corresponding user actions that may be inferred or otherwise determined responsive to the touch inputs.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch screen display 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch screen display in a manner sufficient to register as a touch. In this regard, for example, a touch event could be a detection of pressure on the screen of the touch screen display 68 above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, pinch event (e.g., a pinch in or pinch out), and/or the like.

The gesture classifier 86 may also be configured to communicate detection information regarding the recognition, detection, and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

Turning now to FIG. 3, in general, an apparatus 50 (shown in FIG. 2) is provided, such as an apparatus embodied by a device 100 that includes a touch screen display 105 (such as the display 68 of FIG. 2). In some cases, the touch screen display 105 may be the display 28 of the mobile terminal 10 shown in FIG. 1 (e.g., a cellular phone). As described above, the apparatus may comprise at least one processor (e.g., processor 70 of FIG. 2) and at least one memory (e.g., memory device 76 of FIG. 2) including computer program code. The at least one memory and the computer program code may be configured to, with the processor, cause the apparatus to provide for presentation of a selectable element in a main portion 115 of the display 105. In the depicted embodiment of FIG. 3, three selectable elements are presented in the main portion 115 of the display, including an icon 110*a* for launching an email application, an icon 110*b* for launching a word processing application, and an icon 110*c* for placing a phone call.

The at least one memory and the computer program code may be configured to, with the processor, cause the apparatus to receive a touch input (represented by the oval 120) in an input region 125 proximate the main portion of the display 105 and to determine an extrapolated touch input (represented by the dashed line oval 120') in the main portion 115 of the display based on the location of the touch input 120 in the input region. The at least one memory and the computer program code may be configured to, with the processor, cause the apparatus to provide for selection of the selectable element in an instance in which a location of the extrapolated touch input coincides with a location of the selectable element. As illustrated in FIG. 3, the input region 125 does not overlap with the main portion 115 of the display 105.

Notably, the input region 125 may be provided at any location that is convenient to the user considering the type of device 100 and its configuration (e.g., the size of the display 105 and the intended use of the device, such as whether the device is hand-held, attached to a stand for positioning on a user's desk, or mountable on a wall, for example). In the depicted embodiments, for example, the input region 125 is defined by the display 105 and is disposed along an edge of the display. In FIG. 3, for example, the input region 125 is disposed along a right-hand edge of the display 105, whereas in FIG. 5 the input region 125 is disposed along both a right-hand edge and a bottom edge of the display. Moreover, in some embodiments, the input region 125 may comprise more than one region, which may be continuous or spaced apart, depending on the device and/or the preferences of the user.

Accordingly, in some embodiments, the input region 125 may be defined by a surface (which may or may not be the display surface) that is in the same plane as the display 105. In other embodiments, such as the embodiment shown in FIG. 9, the input region 125 may be defined by a surface that defines a non-zero angle with the display 105, such as a surface that is perpendicular to the surface of the display, as shown. For example, in FIG. 9 and described in greater detail below, the apparatus is embodied by a device 100 that is a wrist watch. In this case, the input region 125 is provided around the rim of the display 105 (which, in this case, serves as the watch face). As such, in the depicted embodiment of FIG. 9, the input region is provided via one or more touch sensors provided on the outside edge of the device, where a digital watch's buttons may otherwise be provided. As described above with respect to the touch screen display, the surface defining the input region 125 in embodiments such as in FIG. 9 may be configured to enable touch recognition by any suitable technique, such as resistive, capacitive, infrared, strain gauge, surface wave, optical imaging, dispersive signal technology, acoustic pulse recognition, and/or other techniques.

In other embodiments, not shown, in which an apparatus as described above is embodied by a watch, the input region 125 may be provided in an area that is not part of the touch screen display, but is in the same plane (or substantially the same plane) as the touch screen display. For example, the input region may be provided in a bezel of the display (which may be round, as shown in FIG. 9, or rectangular or another shape), such that the input region may be in substantially the same plane, but outside of where the pixels of the display are provided.

Turning again to the depicted embodiment of FIG. 3, for example, the user applies a touch input 120 (e.g., using his finger) to the input region 125 at a point along a y-axis of the display 105 that corresponds to a point y1 along the y-axis at which the desired selectable element (in this case, the icon 110*a* for the email application) is displayed. The at least one memory and the computer program code, with the processor (e.g., via the detector 82 of the touch screen interface 80 shown in FIG. 2) may determine that the location along the y-axis of the touch input 120 corresponds to the location along the y-axis of the icon 110*a*. The extrapolated touch input 120' may be determined as one or more points along the x-axis at the same y-coordinate as the applied touch input 120.

In some cases, the extrapolated touch input 120' may be considered to coincide with the location of the selectable element when the location of the extrapolated touch input (e.g., the y-coordinate of the extrapolated touch input in the depicted embodiment) is within a certain distance along the y-axis (e.g., y-coordinate) of the location of the icon 110*a*. For example, the center of the displayed icon 110*a* may be considered the nominal location of the icon, and any touch input 120 resulting in an extrapolated touch input 120' that is within a certain y-distance of the icon center point (e.g., within 1 cm for a touch screen display provided on a mobile phone) may be considered to be a touch input that corresponds to the location of the icon. In other embodiments, the touch input 120 and resulting extrapolated touch input 120' may be considered to have an area (e.g., an area across which pressure from the user's finger or other object is applied to the touch screen 105), and the location of the extrapolated touch input may be considered to coincide with the location of the selectable element 110*a* in an instance in which the corresponding area of the extrapolated touch input overlaps with the area of the icon presented.

In some embodiments, the at least one memory and the computer program code may be configured to, with the processor, cause the apparatus to provide a visual representation of the location of the extrapolated touch input 120' in the main portion of the display. In FIG. 3, for example, the visual representation may be the dashed line oval or some other visual indication (e.g., a color, a shaded area, etc.) of the general location of the extrapolated touch input 120'. In other cases, however, the location of the extrapolated touch input 120' may not be visually apparent on the touch screen display 105.

In still other embodiments, however, the visual representation may comprise a ray 130 extending from the location of the touch input 120 in the input region 125 at least partially into the main portion 115 of the display 105, as illustrated in FIG. 4. The ray 130 may, for example, be an illuminated line that extends along the x-axis from the location of the touch input 120 (e.g., from a nominal location of the touch input, such as a center of the touch input) into the main portion of the display, as shown. In this case, the extrapolated touch input 120' may be considered any point along the ray 130, such that the extrapolated touch input may be deemed to coincide with the location of the selectable element 110a in an instance in which the ray 130 intersects the selectable element.

With reference to FIG. 5, in some embodiments the touch input 120 may comprise a first touch input 120-y, and the extrapolated touch input 120' may comprise first extrapolated touch input 120'-y. The at least one memory and the computer program code may be further configured to, with the processor cause the apparatus to receive a second touch input 120-x in the input region 125 of the display 105, determine a second extrapolated touch input 120'-x in the main portion 115 of the display 105 based on the location of the second touch input in the input region, and provide for selection of the selectable element 110a in an instance in which an intersection of the first extrapolated touch input and the second extrapolated touch input coincides with the location of the selectable element.

For example, in FIG. 5, the input region 125 comprises a portion of the display extending along the y-axis and a portion of the display extending along the x-axis. A touch input 120-y received via the portion extending along the y-axis may be considered a first touch input 120-y that corresponds to the y-coordinate of the desired selectable element, whereas a touch input 120-x received via the portion extending along the x-axis may be considered a second touch input 120-x that corresponds to the x-coordinate of the desired selectable element. The combination of the first and second touch inputs 120-x and 120-y may thus provide an x-y coordinate location $(x_1, y_1)$ of the desired selectable element as shown.

Given the close proximity of icons for the email application 110a and the word processing application 110b in the depicted embodiment of FIG. 5, for example, the user may need to apply two touch inputs substantially simultaneously (e.g., in a manner such that a duration of contact of the first touch input overlaps, at least partially, with a duration of contact of the second touch input) to more accurately specify the desired selectable element. In other cases, however, the first touch input may not need to be applied simultaneously with the second touch input to be considered as designating an x- and y-coordinate of the desired selectable element. For example, the first and second touch inputs may be provided in sequence (e.g., the second touch input being applied within a certain amount of time from application of the first touch input, such as 1-5 seconds). In this way, the user may be able to provide both the first and the second touch input using the same hand and/or the same finger. This may be helpful, for example, when a larger display (such as a wall-mounted display) is involved, in which case it may not be physically possible (due to the larger area of the display) for the user to apply both the first and second touch inputs simultaneously.

In FIG. 5, for example, the icons 110a, 110b are disposed at the same y-coordinate. Thus, a single touch input applied as shown in FIG. 3, for example, may not be adequate to indicate which of the two icons 110a, 110b is desired for selection by the user. The addition of a second touch input may thus represent the x-coordinate of the desired selectable element, such that the intersection of the extrapolated touch inputs 120'-x, 120'-y may pinpoint the selectable element that the user wishes to select.

Referring to FIGS. 6A-7B, in some embodiments, the at least one memory and the computer program code may be configured to, with the processor, cause the apparatus to detect an angle θ (shown in FIGS. 6B and 7B) associated with the touch input 120 and to determine the location of the extrapolated touch input based on the angle of the touch input that is detected. The angle θ may be detected, for example, by a sensor that senses the angle of the finger or other object with respect to the display (e.g., a pressure sensor array and/or a proximity array embedded or otherwise associated with the display).

For example, in FIGS. 6A and 6B, the user may apply a touch input in the input region 125 to select a selectable element 110c that is not located at the y-coordinate corresponding to the y-coordinate of the touch input (e.g., not directly in line with the touch input), but rather is at an angle from the location of the applied touch input (e.g., "below" the y-position of the applied touch input). In the depicted embodiment, the user applies his finger 135 (or other object) at an angle θ to the plane P of the display 105, as shown in FIG. 6B, where the angle θ corresponds to an angle θ' that is used to determine the extrapolated touch input (represented by the ray 130 in FIG. 6A). To select a different selectable element, such as the icon 110b for the word processing application, the user may apply his finger 135 using a different angle θ, which may correspond to a different angle θ' that is used to determine the extrapolated touch input (represented by the ray 130 in FIG. 7A). It is understood that although the angle θ is shown in FIGS. 6B and 7B as an angle in the y-z plane, in other embodiments the angle θ may be in other planes, such as the x-z plane, or in multiple planes. In addition, the angle θ may be used to determine other characteristics of the extrapolated touch input such as, for example, a distance to the desired selectable element (e.g., with a shallower angle θ corresponding to a longer distance from the user's finger 135 to the selectable element).

Accordingly, as shown in FIGS. 8A and 8B, the at least one memory and the computer program code may be configured to, with the processor, cause the apparatus to modify the location of the extrapolated touch input based on a change in the angle θ of the touch input 120. For example, the user may "rock" his finger 135 from a start position 137 at a first angle $θ_1$ to an end position 138 at a second angle $θ_2$ (shown in FIG. 8B). In some cases, such a rocking motion may allow the user to adjust the location of the ray 130 to select a particular selectable element. In other cases, however, the change in the angle from $θ_1$ to $θ_2$ shown in FIG. 8B may be used to determine an extrapolated touch input that "sweeps" a particular area 140 (shown in FIG. 8A as the area defined between the rays 130). In this way, a user may be able to select a selectable element in situations requiring a finer grained control, such as when numerous selectable elements are provided on the display 105 (e.g., more than the three icons shown in the figures). Moreover, such a "sweeping" input may allow the user to select more than one selectable element (e.g., selecting all selectable elements that are within the swept area 140).

Turning again to FIG. 9, in which the input region 125 is provided around the rim of the display screen 105, the user may provide a "rocking" input with respect to the outside rim of the display screen 105. For example, the user may "rock" his finger 135 from a start position 137 (shown in dashed lines) at a first angle $\theta_1$ to an end position 138 (shown in solid lines) at a second angle $\theta_2$. As described above, such a rocking motion may allow the user to adjust the location of the ray 130 to select a particular selectable element (not shown) or select more than one selectable element (e.g., selecting all selectable elements that are within a swept area).

FIG. 10 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an example embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one example embodiment of a method for receiving an indirect touch input is shown in FIG. 10. FIG. 10 depicts an example embodiment of the method that includes providing for presentation of a selectable element in a main portion of a display at block 200 and receiving a touch input in an input region proximate the main portion of the display at block 210, where the input region does not overlap with the main portion. The input region may be disposed along an edge of the display in some cases. An extrapolated touch input in the main portion of the display may be determined based on a location of the touch input in the input region at block 220, as described above, and selection of the selectable element may be provided for in an instance in which a location of the extrapolated touch input coincides with a location of the selectable element at block 230.

In some cases, the first touch input may comprise a first touch input and the extrapolated touch input may comprise a first extrapolated touch input. A second touch input may be received in the input region, and a second extrapolated touch input may be determined in the main portion of the display based on the location of the second touch input in the input region. Selection of the selectable element may be provided for in an instance in which an intersection of the first extrapolated touch input and the second extrapolated touch input coincides with the location of the selectable element.

In still other cases, an angle associated with the touch input may be detected at block 240, and the location of the extrapolated touch input may be determined based on the angle of the touch input that is detected. Moreover, a visual representation of the location of the extrapolated touch input may be provided in the main portion of the display at block 250. For example, as described above, the visual representation may comprise a ray extending from the location of the touch input in the input region at least partially into the main portion of the display. In addition, the location of the extrapolated touch input may be modified based on a change in the angle of the touch input in some embodiments.

In some embodiments, certain ones of the operations above may be modified or further amplified as described below. Furthermore, in some embodiments, additional optional operations may be included. Modifications, additions, or amplifications to the operations above may be performed in any order and in any combination.

In an example embodiment, an apparatus for performing the methods of FIG. 10 above may comprise a processor (e.g., the processor 70 of FIG. 2) configured to perform some or each of the operations (200-250) described above. The processor may, for example, be configured to perform the operations (200-250) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 200, 210, and 240 may comprise, for example, the processor 70, the user interface transceiver 72, and the memory device 76, and/or a device or circuit for executing instructions or executing an algorithm for processing information as described above. Examples of means for performing operation 220 may comprise, for example, the processor 70 and/or a device or circuit for executing instructions or executing an algorithm for processing information as described above. Examples of means for performing operation 230 may comprise, for example, the processor 70, the user interface transceiver 72, communication interface 74, the memory device 76, and/or a device or circuit for executing instructions or executing an algorithm for processing information as described above. Examples of means for performing operation 250 may comprise, for example, the processor 70, the user interface transceiver 72, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   provide for presentation of a selectable element in a main portion of a display;
   receive an indication of a touch input made with a touch object in an input region of the display, wherein the input region does not overlap with the main portion;
   determine an extrapolated touch input in the main portion of the display based on a location of the touch input in the input region of the display and an angle of the touch object relative to a plane defined by a surface of the display; and
   provide for selection of the selectable element in an instance in which a location of the extrapolated touch input coincides with a location of the selectable element.

2. The apparatus of claim 1, wherein the touch input comprises a first touch input and the extrapolated touch input comprises a first extrapolated touch input, and wherein the at least one memory and the computer program code are further configured to, with the processor, cause the apparatus to:
   receive a second touch input in the input region;
   determine a second extrapolated touch input in the main portion of the display based on a location of the second touch input in the input region; and
   provide for selection of the selectable element in an instance in which an intersection of the first extrapolated touch input and the second extrapolated touch input coincides with the location of the selectable element.

3. The apparatus of claim 1, wherein the at least one memory and the computer program code are configured to, with the processor, cause the apparatus to provide a visual representation of the location of the extrapolated touch input in the main portion of the display.

4. The apparatus of claim 3 wherein the visual representation comprises a ray extending from the location of the touch input in the input region at least partially into the main portion of the display.

5. The apparatus of claim 1, wherein the at least one memory and the computer program code are configured to, with the processor, cause the apparatus to modify the location of the extrapolated touch input based on a change in the angle of the touch object relative to the plane defined by the surface of the display.

6. The apparatus of claim 5, wherein the change in the angle of the touch object relative to the plane defined by the surface of the display is caused by a rocking motion of the touch object characterized by at least a portion of the touch object remaining in contact with the display.

7. The apparatus of claim 5, wherein the at least one memory and the computer program code are further configured to, with the processor, cause the apparatus to at least:
   in response to the change in the angle of the touch object relative to the plane defined by the surface of the display, provide for a sweeping selection of a plurality of selectable elements.

8. The apparatus of claim 1, wherein the input region is disposed along an edge of the display.

9. The apparatus of claim 1, wherein the input region is defined by the display.

10. The apparatus of claim 1, wherein the input region of the display is determined based on at least a size of the display.

11. The apparatus of claim 1, wherein the input region of the display is determined based on at least user preferences.

12. A method comprising:
   providing for presentation of a selectable element in a main portion of a display;
   receiving an indication of a touch input made with a touch object in an input region of the display, wherein the input region does not overlap with the main portion;
   determining an extrapolated touch input in the main portion of the display based on a location of the touch input in the input region of the display and an angle of the touch object relative to a plane defined by a surface of the display; and
   providing for selection of the selectable element in an instance in which a location of the extrapolated touch input coincides with a location of the selectable element.

13. The method of claim 12, wherein the touch input comprises a first touch input and the extrapolated touch input comprises a first extrapolated touch input, and wherein the method further comprises:
   receiving a second touch input in the input region;
   determining a second extrapolated touch input in the main portion of the display based on a location of the second touch input in the input region; and
   providing for selection of the selectable element in an instance in which an intersection of the first extrapolated touch input and the second extrapolated touch input coincides with the location of the selectable element.

14. The method of claim 12, further comprising providing a visual representation of the location of the extrapolated touch input in the main portion of the display.

15. The method of claim 14, wherein the visual representation comprises a ray extending from the location of the touch input in the input region at least partially into the main portion of the display.

16. The method of claim 12, further comprising modifying the location of the extrapolated touch input based on a change in the angle of the touch object relative to the plane defined by the surface of the display.

17. The method of claim 16, wherein the change in the angle of the touch object relative to the plane defined by the surface of the display is caused by a rocking motion of the touch object characterized by at least a portion of the touch object remaining in contact with the display.

18. The method of claim 16, further comprising:
in response to the change in the angle of the touch object relative to the plane defined by the surface of the display, providing for a sweeping selection of a plurality of selectable elements.

19. The method of claim 12, wherein the input region is disposed along an edge of the display.

20. The method of claim 12, wherein the input region of the display is determined based on at least a size of the display.

21. The method of claim 12, wherein the input region of the display is determined based on at least user preferences.

22. A computer program product comprising at least one non-transitory computer-readable storage medium having computer-executable program code portions stored therein, the computer-executable program code portions comprising program code instructions for:
providing for presentation of a selectable element in a main portion of a display;
receiving an indication of a touch input made with a touch object in an input region of the display, wherein the input region does not overlap with the main portion;
determining an extrapolated touch input in the main portion of the display based on a location of the touch input in the input region of the display and an angle of the touch object relative to a plane defined by a surface of the display; and
providing for selection of the selectable element in an instance in which a location of the extrapolated touch input coincides with a location of the selectable element.

* * * * *

UNITED STATES PATENT AND TRADEMARK OFFICE
CERTIFICATE OF CORRECTION

PATENT NO. : 11,360,652 B2
APPLICATION NO. : 15/022256
DATED : June 14, 2022
INVENTOR(S) : Kenton Lyons It is certified that error appears in the above-identified patent and that said Letters Patent is hereby corrected as shown below:

On the Title Page

Item [57], Line 5, delete "where as" and insert -- whereas --, therefor.

Signed and Sealed this
Thirtieth Day of May, 2023

Katherine Kelly Vidal
*Director of the United States Patent and Trademark Office*